(12) United States Patent
Braghiroli et al.

(10) Patent No.: US 8,079,254 B2
(45) Date of Patent: Dec. 20, 2011

(54) WHEEL DIAGNOSIS SYSTEM

(75) Inventors: Francesco Braghiroli, Reggio Emilia (IT); Shankar Mukherjee, Gurnee (IL)

(73) Assignee: Snap-On Equipment SRL A Unico Socio, Correggio (RE) (IT)

( * ) Notice: Subject to any disclaimer, the term of this patent is extended or adjusted under 35 U.S.C. 154(b) by 17 days.

(21) Appl. No.: 12/638,613

(22) Filed: Dec. 15, 2009

(65) Prior Publication Data
US 2010/0180676 A1    Jul. 22, 2010

(30) Foreign Application Priority Data

Jan. 22, 2009 (EP) .................................. 09000881

(51) Int. Cl.
*G01M 17/02* (2006.01)

(52) U.S. Cl. .......................................................... 73/146

(58) Field of Classification Search .................. None
See application file for complete search history.

(56) References Cited

U.S. PATENT DOCUMENTS

| | | | |
|---|---|---|---|
| 4,724,703 A * | 2/1988 | Neugebauer et al. ............ | 73/146 |
| 4,936,138 A * | 6/1990 | Cushman et al. ................ | 73/146 |
| 5,172,590 A * | 12/1992 | Adachi et al. ................... | 73/146 |
| 5,174,151 A * | 12/1992 | Adachi et al. ................... | 73/146 |
| 5,351,411 A * | 10/1994 | Gronskov ....................... | 33/551 |
| 6,012,329 A | 1/2000 | Kelm-Klager et al. | |
| 7,269,997 B2 | 9/2007 | Dale, Jr. et al. | |
| 7,360,410 B2 * | 4/2008 | Steinbichler et al. ........... | 73/146 |
| 7,469,579 B2 * | 12/2008 | Iwase et al. ..................... | 73/146 |
| 2008/0011074 A1 * | 1/2008 | Braghiroli ....................... | 73/146 |
| 2008/0202229 A1 * | 8/2008 | Maehner et al. ................ | 73/146 |
| 2009/0282905 A1 * | 11/2009 | Dengler et al. ................. | 73/146 |

FOREIGN PATENT DOCUMENTS

| EP | 0 816 799 A2 | 1/1998 |
|---|---|---|
| WO | WO 96/10727 | 4/1996 |

OTHER PUBLICATIONS

Extended European Search Report issued in European Patent Application No. EP 09000881.4-1236, dated May 7, 2009.

\* cited by examiner

*Primary Examiner* — Andre Allen
(74) *Attorney, Agent, or Firm* — McDermott Will & Emery LLP (57) ABSTRACT

According to the present invention there is provided a wheel diagnosis system (DS) for diagnosing a wheel (12) under test mounted to a vehicle and including at least a rim (18) and a tire (13). The wheel diagnosis system comprises a plurality of sensing units (1, 2, 3) being adapted for scanning predetermined surfaces of the wheel under test when the wheel under test is rotated, a supporting unit (5) to which the plurality of sensing units is mounted. Specifically, the supporting unit is freely movable relative to the wheel under test, and the sensing units are located at different positions on the supporting unit for scanning different portions of the predetermined surfaces of the wheel under test and collecting data of the operation result when the supporting unit is placed at the wheel under test at a predetermined scanning position. The present invention further refers to a method of diagnosing the condition of the wheel under test mounted to a vehicle.

15 Claims, 7 Drawing Sheets

WHEEL DIAGNOSIS SYSTEM

FIELD OF THE INVENTION

The present invention relates to a wheel diagnosis system, and in particular to a touchless diagnosis system for diagnosing the condition of a wheel mounted on a vehicle.

BACKGROUND OF THE INVENTION

The following terms may be used throughout the description presented herein and should generally be given the following meaning unless contradicted or elaborated upon by other descriptions set forth herein.

"Wheel" refers to a generally cylindrical, typical metallic, disc-like mechanical support for supporting a typically pneumatic tire and mounting to a vehicle axle. A wheel has two axially spaced-apart flanges (or annular lips), each flange adapted to securely receive a respective one of the two beads of the mounted tire.

"Tire" is a laminated mechanical device of generally toroidal shape (usually an open-torus) having two beads, two sidewalls and a treaded surface, made of rubber, chemicals, fabric and steel or other materials, and typically inflated with air under pressure. A tire is mounted in the rim bed of a rim (rim being detailed hereinafter).

"Sidewall" of a tire refers to a portion of the tire between the treaded surface (tread surface, usually the running surface of the tire) and the bead.

The term "rim" refers to the part of a wheel that is made of metal, in particular aluminium, steel, or other alloy, and to which a pneumatic tire, usually made of rubber, is attached. The rim includes a peripherally extending rim bed to which the tire is attached (mounted), and a wheel disc portion within the peripherally extending rim bed. That wheel disc portion may have apertures or no aperture at all. The wheel disc may also be formed from spokes.

A non-contact method and a system for analyzing tire conditions by directing radiation to to the tire to be examined and sensing reflected radiation (scanning) is, for example, disclosed in document U.S. Pat. No. 7,269,997 B2.

This non-contact or touchless method and system for analyzing tire conditions includes an emitter source for emitting radiation signals towards a tire under test. The tire has a tread surface ranged between two sidewalls, and the tire is mounted on a rim to provide a complete vehicle wheel (vehicle wheel assembly). Detecting means receive signals reflected by the tire in response to the emitted radiation signals and output a corresponding detection result. The detection result is supplied to a processing system based on a microcomputer, and the processing system which is coupled to the emitter source and the detector, obtains a geometrical information, such as a height of a plurality of points on the tire based on the detection signals of the detecting means. Based on the data obtained and the height information a condition of the tire can be determined such as a wear of the tire and any damaged portion. A corresponding surface profile even with colour-coded height information can be displayed for the user indicating the detected tire condition. The surface profile of the tire is obtained by scanning the wheel surface while rotating the wheel.

According to the technical teaching of this reference, an arrangement is provided to which the vehicle wheel is to be mounted, and under control of the processing system (having the function of a controller) the wheel is rotated and the scanning means are operated for obtaining the scanning or detection result. Hence, for obtaining a proper detection result it is necessary to detach the vehicle wheel from the wheel suspension of the vehicle and to mount the vehicle wheel to be tested on the system for analyzing the tire conditions. This is time consuming and requires a lot of work for the operator or staff to obtain from a vehicle wheel (or from plural wheels) to be tested and which has been in regular use the corresponding information upon which an analysis can be based.

SUMMARY OF THE INVENTION

In view of the prior art it is therefore an object of the present invention, to provide a wheel diagnosis system which allows an easy and reliable collection of data for performing a wheel diagnosis with reduced effort and time.

According to the present invention, this object is accomplished by a wheel diagnosis system as well as a corresponding wheel diagnosis method as set out in the appended claims.

According to a first aspect of the present invention there is provided a wheel diagnosis system for diagnosing a wheel under test mounted to a vehicle. The wheel diagnosis system comprises a plurality of sensing units being adapted for scanning predetermined surfaces of the wheel under test when the wheel under test is rotated, a supporting unit to which the plurality of sensing units is mounted, wherein the supporting unit being freely movable relative to the wheel under test, and the sensing units being located at different positions on the supporting unit for scanning different portions of the predetermined surfaces of the wheel under test and collecting data of the operation result when the supporting unit is placed at the wheel under test at a predetermined scanning position.

According to a second aspect of the present invention there is provided a method of diagnosing the condition of the wheel under test mounted to a vehicle, the method comprising the steps of freely moving a supporting unit having a plurality of sensing units located thereon at different positions thereof, to a predetermined location relative to the wheel under test, controlling the plurality of sensing units for performing a scanning operation of different surfaces of the wheel under test and outputting a scanning result when the wheel under test is rotated, thereby collecting data of the scanning result, and evaluating the collected data to define the condition of the wheel under test.

Regarding the first and second aspects of the present invention, the supporting unit which is a mechanical device, carries the plurality of sensing units (which may be provided as plural cameras) of the wheel diagnosis system, and since the supporting unit is freely movable and is provided as a separate device, the supporting unit can be moved towards the vehicle wheels (including at least a rim and a tire) which are to be examined, that is, for which a diagnosis is to be made. When the vehicle has been lifted to a certain extent so that at least the specific wheel to be tested no longer contacts a ground surface and can be rotated, the wheel diagnosis system and specifically the supporting unit can be freely moved and placed at an optimized scanning position close to the vehicle wheel under test, and scanning of the vehicle wheel can be performed. That is, the scanning as performed includes scanning of different portions of the predetermined surfaces of the vehicle wheel, and to this end, the plurality of sensing units are mounted to the supporting unit in such a manner to be located at different positions thereof. The different positions allow scanning of the different surfaces of the vehicle wheel from different viewing directions.

Accordingly, it is no longer necessary to detach the vehicle wheel under test from the vehicle but only to lift the vehicle and place the freely movable supporting unit with the plurality of sensing units mounted thereon at the corresponding or optimized scanning position. This considerably reduces work and effort of the operator or user and facilitates the process since it is only necessary to lift the vehicle which is anyway required when it is intended to dismount at least one wheel from the vehicle. Therefore, a precise and optimized scanning or collecting of information about the condition of the respective vehicle wheel under test can be achieved more easily and within a shorter period of time.

Preferred embodiments of the present invention are defined in the dependent claims.

In conjunction with the first aspect of the present invention the wheel under test includes at least a rim and a tire. Each of the sensing units may have a predefined scanning range, each of the scanning ranges being directed to one of the tread surface and a first and a second sidewall of the tire, resulting in the detailed scanning of the complete surface of interest of the tire by a respective sensing unit.

The system further includes a rotary encoder which is mechanically coupled to the wheel under test by a contact roller and which is adapted for detecting a rotational movement of the wheel. This results in the provision of angle-related data structure of the collected data of the wheel (tire) under test.

The system may further comprise a drive unit operatively connected to the wheel under test by a contact roller and being adapted for rotating the wheel in a predetermined manner when the supporting unit is in the predetermined operation position. Moreover, there may also further be provided a gearbox being arranged for coupling the drive unit to the contact roller. This leads to a drive unit for rotating the wheel under test in a motorized manner so that a predetermined rotation can be obtained. The control may be performed by a control unit.

The supporting unit may further comprise a first movable arm and a second movable arm on which a first and a third sensing unit of the plurality of sensing units are respectively mounted, for varying the position of the first and third sensing units on the supporting unit.

Moreover, the supporting unit may further include first, second and third servo devices respectively carrying the plurality of sensing units, for varying a scanning direction respectively assigned to each of the plurality of the sensing units.

The supporting unit may further include first, second and third sensor actuators respectively carrying the plurality of sensing units, for varying a scanning direction respectively assigned to each of the plurality of the sensing units.

Furthermore, the supporting unit may be movable in a manual manner or in a motorized manner by a driving device for moving the supporting unit relative to the wheel under test. This facilitates the free moving of the supporting unit and can be set and controlled by the operator.

In conjunction with the second aspect of the present invention the wheel under test may include at least a rim and a tire, and each of the sensing units may have a predetermined scanning range, and the controlling step may include the step of controlling the plurality of sensing units for picking up images of at least a tread surface and a first and a second sidewall of the tire.

The controlling step of the method may further include a step of inputting an angular reference information obtained by a rotary encoder from the wheel under test when rotated during the scanning operation, and the step of assigning the angular reference information to the collected data of the scanning result when the wheel under test is rotated, as well as inputting a pressure information obtained by a pressure sensor indicative of the pressure between said contact roller and said wheel under test.

The controlling step may further include the step of picking up an image of a check mark provided to a predetermined position on the wheel under test as an angular reference information during the scanning operation when the wheel is rotated, and the step of assigning the angular reference information to the collected data of the scanning result of the wheel under test when rotated.

The method may further comprise a step of controlling a drive unit operatively connected to the wheel under test by a contact roller, for causing the drive unit to rotate the wheel under test in a predetermined manner.

The step of controlling the drive unit may include a step of performing a control of the drive unit depending upon the detection of the check mark as an angular reference information, during the scanning operation when the wheel under test is rotated by the drive unit.

The step of controlling the drive unit may include a step of performing a control of the drive unit depending upon the angular reference information provided by the rotary encoder during the scanning operation when the wheel under test is rotated by the drive unit.

The present invention is further elucidated by the following figures and examples which are not intended to limit the scope of the present invention. Specifically, the above-mentioned and other aspects of the present invention will be apparent from and explained with reference to the embodiments described hereinafter.

BRIEF DESCRIPTION OF THE DRAWINGS

In the following drawings

DETAILED DESCRIPTION OF THE DRAWINGS

First Embodiment

Figure 1:
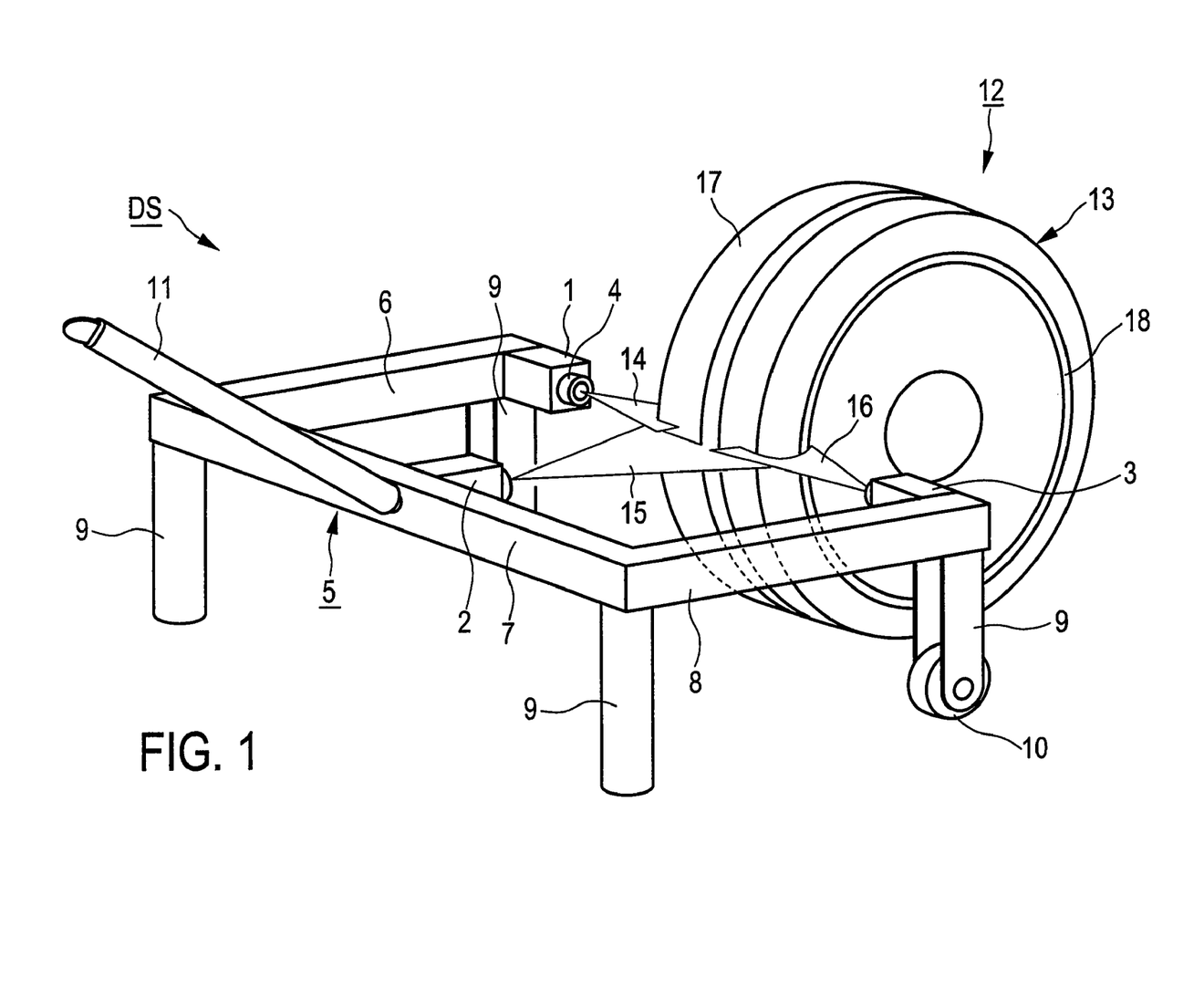
FIG. 1 shows an arrangement of the wheel diagnosis system according to a first embodiment of the present invention.

FIG. 1 shows an arrangement of the wheel diagnosis system DS according to a first embodiment of the present invention.

The arrangement of the wheel diagnosis system as shown in FIG. 1 constitutes a basic arrangement (basic setup) of the wheel diagnosis system according to the present invention, and includes a plurality of sensing units, such as for example a first, a second and a third sensing unit. The plural sensing units may be provided as cameras (SOL cameras, stripe-of-light cameras) or any other suitable image pick-up means. In the following it is referred to a first camera 1, a second camera 2 and a third camera 3. The plurality of cameras 1, 2 and 3 function as the sensing units or sensor means for picking up images of an object to which the cameras are directed and on which they are focussed. To this end, each camera includes an imaging optical system 4, which is, for example, shown in FIG. 1 in conjunction with the first camera 1. Preferably the cameras (sensing units) are of the same structure and function, but the present invention is not confined to such an arrangement. It is possible to use cameras of different functional and optical properties. The plurality of cameras 1 to 3 may be adapted for obtaining the images by scanning in a predetermined manner the object of interest.

The plurality of cameras 1 to 3 is mounted to a supporting unit 5 which may be preferably arranged as a frame on which the plurality cameras 1 to 3 are located at different positions. The supporting unit 5 may have, for example a left frame portion 6, a central frame portion 7 as well as a right frame portion 8, the left and right frame portions 6 and 8 being connected to each other by means of the central portion 7, thereby forming a rigid and stable frame. At a distal end of each of the left frame portion 6 and the right frame portion 8, a camera (sensing unit) such as the first camera 1 and the third camera 3 are respectively mounted. The first and third cameras 1 and 3 are preferably substantially directed to opposing directions for picking up images of any object being arranged between the first and the third cameras 1 and 3. It is also possible to direct the first and third cameras 1 and 3 at different viewing angles for picking-up an image of the object of interest.

The central frame portion 7 is provided with the second camera 2 the image pick-up direction thereof being adapted for also picking up images of an object arranged between the first and third cameras 1 and 3 form a different viewing angle.

The supporting unit 5 is provided with a plurality of stands for obtaining a certain height of the supporting unit 5 relative to the ground level, and some of the stands are provided with rollers 10 so that the supporting unit 5 can be freely moved and positioned preferably on a flat and even surface.

For easily moving the supporting unit 5 in a free manner by the operator or user the supporting unit 5 may be provided with a handling means such a for example a handle bar 11 by means of which the user can slightly lift the supporting unit like a hand barrow and can move the supporting unit 5 by using the rollers 10 equipped to some of the stands 9. The arrangement and shape of the handling bar 11 is only an example and any other suitable handling means may be adopted for freely moving the supporting unit 5.

The wheel diagnosis system DS according to the present invention must be placed close to a vehicle wheel 12 to be examined. The vehicle having the wheel 12 to be examined must be lifted to a certain extent in a motor-driven manner or manually, so that the vehicle wheel 12 to be tested no longer contacts the ground surface on which the vehicle is standing. Accordingly, if further a gearshift of the vehicle is put into the neutral position and any braking means are released, the corresponding vehicle wheel 12 to be tested (in the following named wheel 12 under test) can be rotated.

Accordingly, when the wheel diagnosis system DS in conjunction with the supporting unit 5 is moved towards the wheel 12 under test and is placed at an optimized position suitable for scanning the wheel and specifically the surface of the tire thereof, the scanning of the surface of the tire of the wheel under test can be started. More specifically, according to the arrangement of the first embodiment of the present invention shown in FIG. 1, the wheel 12 under test is still mounted to the vehicle but free from any contact to the ground surface so that the wheel 12 under test can be moved in a predetermined manner and manually by the user of the wheel diagnosis system DS.

Regarding the scanning operation to be performed by the plurality of cameras 1 to 3 (sensing units) for scanning the wheel 12 under test, and more specifically the surfaces of the tire 13 of the wheel 12, each of the plurality of cameras 1 to 3 has its own scanning range. That is, the first camera 1 has a first scanning range 14, the second camera 2 has a second scanning range 15, and the third camera 3 has a third scanning range 16. The different scanning ranges 14 to 16 of the plurality of cameras 1 to 3 cover different surfaces of the complete surface of the tire 13. In detail, the first scanning range 14 of the first camera 1 covers a left sidewall of the tire 13, the second scanning range 15 of the second camera 2 covers the surface of the tire 13 having a tread 17 (the tread surface 17), and the third scanning range 16 of the third camera 3 covers a right sidewall of the tire 13.

Accordingly, all interesting surfaces, such as the above-mentioned predetermined surfaces of the tire 13 can be scanned. That is, each camera of the plurality of cameras 1 to 3 performs a scanning operation and thus an image pick-up operation of a particular one of the predetermined surfaces of the tire 13 and picks-up corresponding images of the respective predetermined surfaces of the tire 13, these images being provided as electrical signals and constituting detection signals of the plural cameras 1 to 3 (sensing units). It is to be noted that depending upon the positioning of the supporting unit 5 close to the wheel 12 under test any region or area of interest of the wheel 12 can be scanned and made subject matter of the wheel diagnosis.

The wheel diagnosis system DS according to the present invention therefore constitutes a touchless, on-the-car wheel diagnosis system where specifically a diagnosis is performed while the wheel 12 under test is still mounted to the vehicle. From the detection results of the plural cameras 1 to 3 diagnostic data are obtained after processing.

The operation of the plurality of cameras 1 to 3 enables the wheel diagnosis system DS to measure the tread of the tire (tread surface 17) and the sidewall geometric characteristics while the wheel 12 is still mounted on the vehicle. The wheel diagnosis system DS measures the characteristics of the wheel 12, and more preferably the characteristics of the tire 13, and can display the diagnostic information on a local display means (not shown in FIG. 1) based on the picked-up images.

The plurality of cameras 1 to 3 are connected for data transmission to a central control unit CCU which is not shown in FIG. 1 (it is in this connection referred to the description of FIG. 5), and the diagnostic information can be displayed on a local display or can be transmitted to a remote computer (host computer) for storage and/or display. Specifically, the connections of the plural cameras 1 to 3 and the corresponding communication can be either performed via cables or in a wireless manner, based on RF (radio frequency) communication, infrared signals or any suitable further transmission concept. Different transmission channels can be provided for the plural cameras 1 to 3 and for control thereof.

The wheel diagnosis system DS allows the wheel and/or tire diagnosis without removing the wheel 12 from the car. It is only necessary that the operator, after having placed the freely movable supporting unit 5 to a predetermined or optimized scanning position close to the wheel 12 under test, and when the operation of the plural cameras 1 to 3 is started, the wheel 12 must be rotated for at least one complete revolution in a manual manner by the operator or user. The arrangement shown in FIG. 1 of the present invention which is based on a manual rotation of the wheel 12 under test therefore constitutes a basic arrangement or basic setup involving manual rotation of the wheel 12 under test.

With this basic setup the user or operator has to lift the car to have a free rotatable wheel 12 under test, place the wheel diagnosis system DS close to the wheel 12 or tire 13, and manually rotate the wheel 12 for at least one complete revolution while the plural cameras 1 to 3 are operated for performing the scanning operation. Corresponding data in the form of the detection signals of each of the plurality of cameras 1 to 3 are collected. Collected data can be transmitted to the local computer and or to host computer for further data evaluation and processing.

For obtaining an angular relationship of the picked-up information (scanning information, detection result) of each of the plurality of cameras 1 to 3 when scanning the predetermined surfaces of the wheel 12 under test while rotating, a marker (a check mark or a sticker, not shown in FIG. 1, see FIG. 3) can be applied to the rim 18 or the tire 13 at a predetermined position thereof, preferably to at least one of the sidewalls of the tire 13. In the latter case, one of the sidewall cameras (for example the first or third camera 1 or 3) can detect the check mark or sticker, and this can be used as an angular reference when evaluation of the picked-up data (scanned images, detection signals) is performed. More specifically, the function of the check mark or sticker as a reference can be used by the data evaluation software to detect, when a complete revolution has been reached, assuming that the operator keeps the wheel 12 rotating in one and the same direction. In particular, an angular reference (angle information) can be assigned to the collected data of the wheel 12 under test, thereby allocating an angle information to a section of an image as a geometrical reference.

When the supporting unit 5 has been placed close to the wheel 12 under test, a setting of each of the plurality of cameras 1 to 3 can be carried out, adapting the plural camera 1 to 3 in view of their scanning directions and the correct focussing thereof on the respective predetermined surface of the wheel 12 under test. Preferably, the three cameras 1 to 3 perform the scanning operation simultaneously so that only one complete rotation of the wheel 12 under test has to be made by the operator.

In case control of each of the plurality of cameras 1 to 3 is performed for obtaining a consecutive scanning operation, then plural complete rotations of the wheel 12 under test are necessary to obtain a complete scanning of the wheel 12 under test or of the portion of interest.

It is also possible to omit application of a check mark or sticker, and the angular relationship between the collected data and the actual positions of the scanned surface of the tire 13 is not known. Diagnosis is based on overall minimal and maximal data. An angular reference can also be input by a user as an instruction before operating the plural cameras 1 to 3 and rotating the wheel 12 under test.

When a tire diagnosis is to be performed based on the scanned data (detection results of the images picked-up by the plurality of cameras 1 to 3), it can be determined a possible worn-out tire if the general tread depth is low, and it can be determined a flat spot if the maximum deviation of the tread readings (particular scanning results) is too high (relative to a predetermined threshold value). This can be determined based on a particular range of an appropriate tire and appropriate threshold values in conjunction of which the user or operator is informed when such a threshold value is exceeded by any evaluated detection result.

Moreover, a possible bulge or any depression can be detected, if the maximum deviation of the scanning result of a particular sidewall (sidewall readings) is too high. This can also be determined in conjunction with ranges or predetermined threshold values. It is also possible to detect a camper tread wear pattern if one shoulder is generally worn-out. Other measurements are possible, such as any measurement regarding a damage of the rim close to the sidewall of the tire which may also be damaged when the vehicle wheel in question has hit a curb stone. When the entire measurement result, that is, the scanning result of the plurality of cameras 1 to 3 is compared with predetermined information stored in general in a computer to which the cameras 1 to 3 are connected for data evaluation, than even small damages or slight deformation can be detected and be evaluated and prepared for presentation to the user or operator for quick and facilitated reference thereof.

The arrangement of the wheel diagnosis system DS as mentioned above in conjunction with FIG. 1 describing the touchless on-the-car tire diagnosis system may be connected to or may include a compact embedded personal computer PC or a similar hardware board which may be connected by means of a corresponding bus system (USB, IEE1394 or equal) to the plurality of cameras 1 to 3 to pick-up and collect the diagnostic data and to prepare the respective data for display and storage.

The system as described above allows the tire diagnosis without removing the wheel 12 under test from the car. This is a significant advantage when a wheel alignment or suspension test operation is to be recommended as the operator can proceed directly with less work. Lifting the vehicle at least slightly to place the wheel diagnosis system DS close to the wheel 12 to be tested is necessary in anyway when it is intended to remove the wheel 12 from the vehicle. Accordingly, the wheel diagnosis system DS according to the present invention provides the advantage that less effort is necessary for testing the vehicle wheel, and specifically the tire 13 thereof. Easy and facilitated collection of data of the conditions of the vehicle wheel 12 and the tire 13 thereof can be obtained with reduced work and time. The configuration as described in conjunction with the first embodiment of the present invention is extremely compact, light weight and portable, and the operator needs to perform one measurement only, including the tread surface 17, the left sidewall and the right sidewall at a time, so that efficiency of the tire analysis (wheel diagnosis) is improved. The arrangement of the wheel diagnosis system DS according to the first embodiment of the present invention is highly efficient in all cases of wheel diagnosis and specifically when only tread analysis is required.

The supporting unit 5 is freely movable in an easy manner preferably on a flat surface and can be positioned in an optimized manner to reach the predetermined scanning position relative to the vehicle wheel 12 under test. When the predetermined scanning position (predetermined operation position) has been reached the operation of the cameras can be started, that is, the cameras are started to perform the scanning operation. For having only one complete revolution of the wheel 12 under test each of the plurality of cameras 1 to 3 are operated during this one complete revolution. In case, after data evaluation, a deviation between predetermined and stored data (stored standard) or specific reference data exceeds a predetermined threshold value, then the operator or user can be informed accordingly (alarming condition).

Second Embodiment

Figure 2:
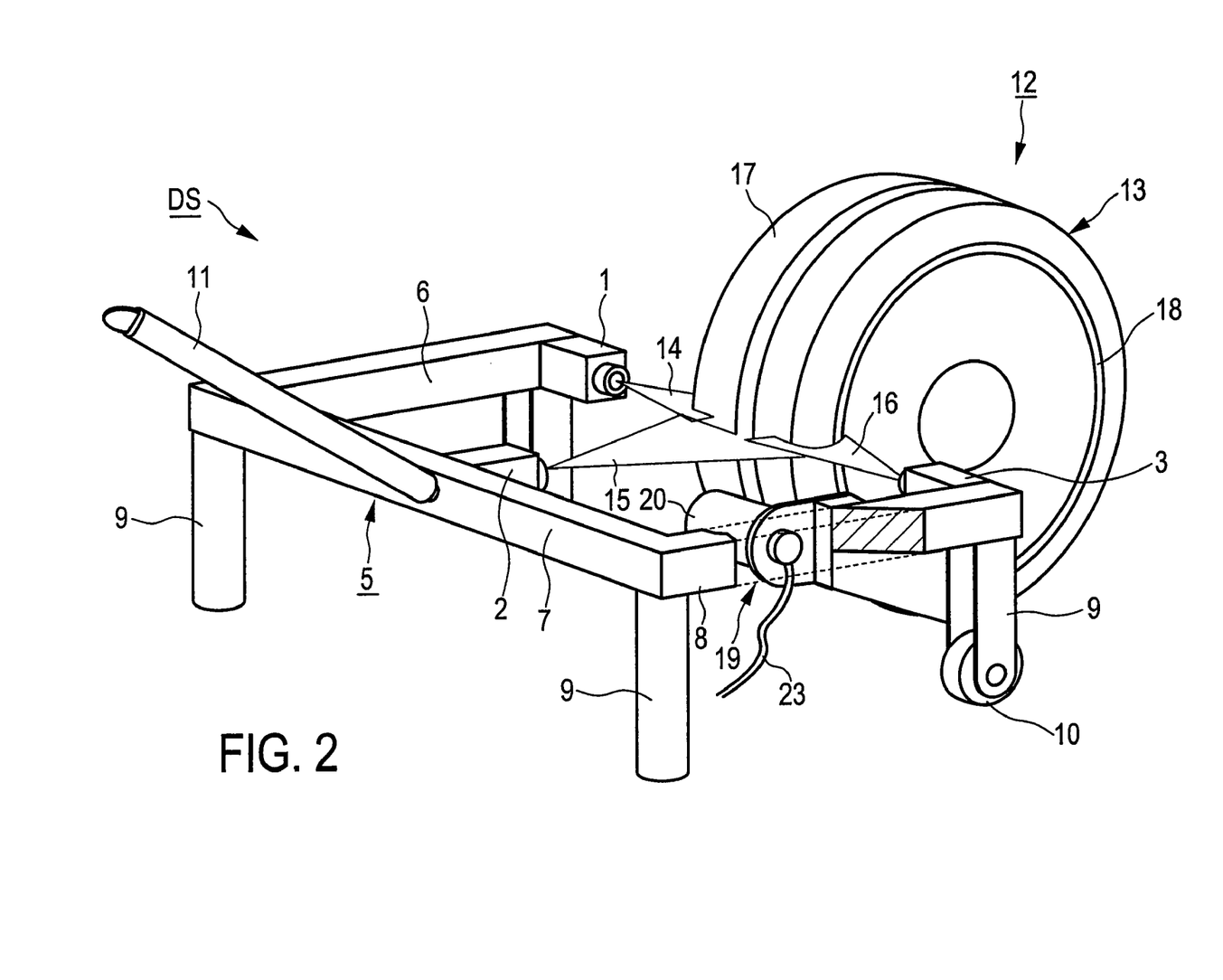
FIG. 2 shows an arrangement of the wheel diagnosis system according to a second embodiment of the present invention.

With reference to FIG. 2 the wheel diagnosis system DS according to a second embodiment of the present invention is described in the following.

In FIG. 2 the same reference numbers are used for defining the same or corresponding means and units as they have been described in conjunction with FIG. 1, and a further detailed description is therefore omitted.

The arrangement of the wheel diagnosis system DS according to the second embodiment of the present invention and as shown in FIG. 2 is basically the same as that shown in FIG. 1, wherein a plurality of sensing units such as cameras 1 to 3 is mounted on different positions thereof, and the cameras are arranged for scanning an object of interest, such as a vehicle wheel 12 or the tire 13 thereof from different directions, thereby obtaining a detection (scanning) result of different predetermined regions or areas of the wheel 12 (tire 13) under test.

In a corresponding manner as it has been described in conjunction with first embodiment, the supporting unit 5 of the second embodiment is likewise freely movable can be easily positioned close to the vehicle wheel 12 under test for performing the scanning operation. To this end, at least some of the stands 9 of the supporting unit 5 are provided with rollers 10 for easily moving the complete supporting unit 5 including the plurality of cameras 1 to 3. The operator can use a handle bar 11 for moving and positioning the supporting unit 5 the handle bar 11 as shown in FIG. 2 only being an example.

The supporting unit 5 according to the second embodiment also includes a left frame portion 6, a central frame portion 7 as well as a right frame portion 8. The respective frame portions are completely shown in FIG. 1. In contrast thereto, in FIG. 2, the representation of the right frame portion 8 includes a cut-away portion for in greater detail depicting an additional component of the wheel diagnosis system DS according to the second embodiment. That is, a part of the right frame portion is omitted to depict the arrangement and preferred position of the incremental (rotary) encoder 19.

Specifically, the wheel diagnosis system DS according to the second embodiment includes as an additional component an incremental encoder 19 (rotary encoder). The incremental encoder 19 is mechanically connected with a contact roller 20 which is in close contact to the tread surface 17 of the tire 13 of the wheel 12 under test. In particular, the incremental encoder 19 (the contact roller 20 thereof) touches the tread surface 17 of the tire 13, and the incremental encoder is rotated in close contact to the vehicle wheel 12 under test when the wheel 12 is rotated.

As it has been described in conjunction with the first embodiment, for providing the diagnosis according to the present invention the vehicle must be lifted to a certain extent so that the vehicle wheels or at least the vehicle wheel 12 under test no longer touches the ground surface and can be rotated, and the supporting unit 5 is moved close to the wheel 12 under test and specifically to the predetermined operation (scanning) position.

When the wheel 12 under test rotated during the scanning or image pick-up operation of the plural cameras 1 to 3, the incremental encoder 19 also rotates and provides a mechanical or geometrical reference corresponding to an angle of rotation of the wheel 12 under test. In more detail, the incremental encoder 19, when the contact roller 20 contacts the rotating wheel 12 under test provides an angular reference information, so that during performance of the scanning operation by the plurality of cameras 1 to 3 each information or a scanning result picked-up by the plurality of cameras 1 to 3 can be assigned to a particular angle relative to a reference angle.

The detection result provided by the incremental encoder 19 when the wheel 12 under test is manually rotated by the operator or user is fed to a personal computer or any equivalent data evaluation device (such as, for example, a hardware board) to perform the data evaluation and to provide collected data in conjunction with an angular information relative to an angular reference value. Corresponding data can be stored and can be further processed to obtain, preferably on a monitor or screen (not shown) an image for the user or operator to be observed representing the complete detection result preferably as a three-dimensional representation (image). The detection result of the incremental encoder 19 can be supplied to the data evaluation system or personal computer PC via cable or any suitable wireless manner.

Accordingly, the arrangement shown in FIG. 2, wherein in addition to the arrangement shown in FIG. 1, the incremental encoder 19 is provided, also constitutes a basic setup of the wheel diagnosis system DS of the present invention, and requires less effort, work and time for the operator or user to obtain a complete and reliable detection result reflecting the condition of the tire 13 or of other parts of the vehicle wheel 12 under test which are of particular interest and which can be scanned by the arrangement of the plurality of cameras 1 to 3. It is only necessary that the user lifts the vehicle to a certain extent so that the vehicle wheel 12 of interest can be rotated, places the wheel diagnosis system DS in the manner as described above close to the tire 13 for which diagnosis is to be performed, and manually rotates the wheel 12 for at least a complete revolution while the plural cameras 1 to 3 are operated and performed the scanning operations and the collection of corresponding scanning data.

The arrangement shown in FIG. 2 exhibits the same advantages as the arrangement shown in FIG. 1, as well as an additional advantage of this manual setup that complete diagnostic data can be collected with reference to angular positions of the wheel 12 or the tire 13 when rotated. This allows a complete and even more precise diagnostic capability of the wheel diagnosis system DS according to the second embodiment of the present invention.

In a similar manner as in the first embodiment, a manual presetting of the cameras 1 to 3, and specifically a calibration or a fine tuning of the camera operation in conjunction with the predetermined position of the supporting unit 5 relative to the wheel 12 under test can be performed by the operator. In addition to the first embodiment, it is necessary to place the supporting unit 5 in such a manner close to the vehicle wheel 12 under test that the contact roller 20 of the incremental encoder 19 has a close contact (with a certain pressure) to the tread surface 17 of the tire 13 so that the incremental encoder 19 is reliably rotated without any slip when the wheel 12 under test is rotated.

Third Embodiment

A third embodiment of the wheel diagnosis system according to the present invention will be described hereinafter in conjunction with FIGS. 3 to 5.

The basic arrangement of the wheel diagnosis system DS of the third embodiment is similar to that of the first embodiment shown in FIG. 1 and of the second embodiment shown in FIG. 2, specifically in view of the arrangement of the supporting unit 5 including a left frame portion 6 central frame portion 7 and a right frame portion 8 and being equipped with stands 9 wherein at least some of the stands 9 have rollers 10 for freely and easily moving the complete supporting unit 5. On different positions on the supporting unit 5 the plurality of sensing units such as cameras, including a first, second and the third camera 1 to 3 are mounted. The plurality of cameras 1 to 3 are arranged for in the above-described manner scanning the vehicle wheel 12 under test and specifically the tire 13 thereof (treaded surface, tread 17) and obtaining detection results (detection signals) from which after corresponding data evaluation diagnosis data are derived.

That is, when the wheel 12 under test is rotated by at least one complete rotation the plural cameras 1 to 3 carry out the scanning operation of the predetermined surfaces of the tire 13 (tread 17 and both sidewalls of the tire 13), and the scanning result of the at least three cameras is suitable for further data evaluation to provide an information to the user or operator and to obtain a suitable image on a monitor or screen reflecting the collected data and indicative of the condition of the tire 13.

In addition to the first and second embodiments, respectively, further means are provided to obtain, according to the third embodiment, an arrangement or setup which includes a drive means for rotating the vehicle wheel 12 under test.

Specifically, the representation of the right frame portion 8 includes a cut-away part (omitted portion) to more clearly depict an incremental encoder 19 which is rotated when the vehicle wheel 12 under test is rotated, by means of a contact roller 20 being in close contact (certain pressure) with the tread surface 17 of the tire 13. The incremental encoder (rotary encoder) 19 coupled to the contact roller 20 provides, as already described in conjunction with the second embodiment, the provision of an angular reference (angular reference information) to the data collected by each of the plurality of cameras 1 to 3 when the vehicle wheel 12 under test is rotated.

The arrangement or setup of the wheel diagnosis system DS according to the first and second embodiments constitutes a manual setup, wherein it is required that the user or operator manually rotates the vehicle wheel 12 for obtaining at least one complete revolution thereof during the scanning operation of the plurality of cameras 1 to 3.

The wheel diagnosis system DS according to the third embodiment of the present invention constitutes a motorized setup, and to this end, a drive unit 21 in the form of a motor is provided. The drive unit may preferably be an electric motor which can suitably be controlled in view of running direction, torque and rotational speed, and the drive unit 21 may be directly connected to the contact roller 20 of the incremental encoder 19.

When the drive unit 21 is supplied with power the drive unit 21 rotates and drives the contact roller 20 which is in close contact to the tread surface 17 of the tire 13. Accordingly, the tire 13 rotates as long as and in accordance with the manner in which the drive unit 21 is operated (is supplied with power).

The power supply to the drive unit 21 can be controlled in such a manner that a smooth and uniform rotation of a vehicle wheel 12 under test is obtained. As the incremental encoder 19 provides a measurement result reflecting an angular rotational position of wheel 12 the drive unit 21 may be controlled to obtain the desired at least one full revolution of the wheel 12 under test. During the operation of the drive unit 21 and the rotation of the wheel 12 under test the plurality of cameras 1 to 3 is activated for performing the scanning operation and for collecting data reflecting the condition of the tire 13. The angular information (angular reference) is assigned to the collected data.

Accordingly, an overall control can be performed, the controlled items including the plurality of cameras 1 to 3, the drive unit (electric motor) 21 as well as the incremental encoder 19 coupled to the contact roller 20 being driven by the drive unit 21 and thereby rotating the wheel 12. The control can be performed by any personal computer or suitable hardware board and may include a suitable software for performing the necessary control steps.

The arrangement of the wheel diagnosis system DS according to the third embodiment of the present invention may further include a gearbox 22 which may be provided between the drive unit 21 and the contact roller 20. The gearbox 22 may include a transmission system for transmitting the rotational speed of the drive unit 21 to the contact roller 20. When the drive unit 21 is activated (supplied with power) and rotates, the rotation is provided to the gearbox 22 and further transmitted to the contact roller 20, and the gearbox 22 may for example cause a reduction or increase of the rotational speed of the drive unit 21 according to the requirements.

The arrangement of the drive unit 21 and the gearbox 22 may also be combined with the incremental encoder (rotary encoder) 19 for providing, when the wheel 12 under test is rotated, an angular reference to the collected data picked-up by the plurality of cameras 1 to 3 and being arranged on the supporting unit 5.

Figure 4:
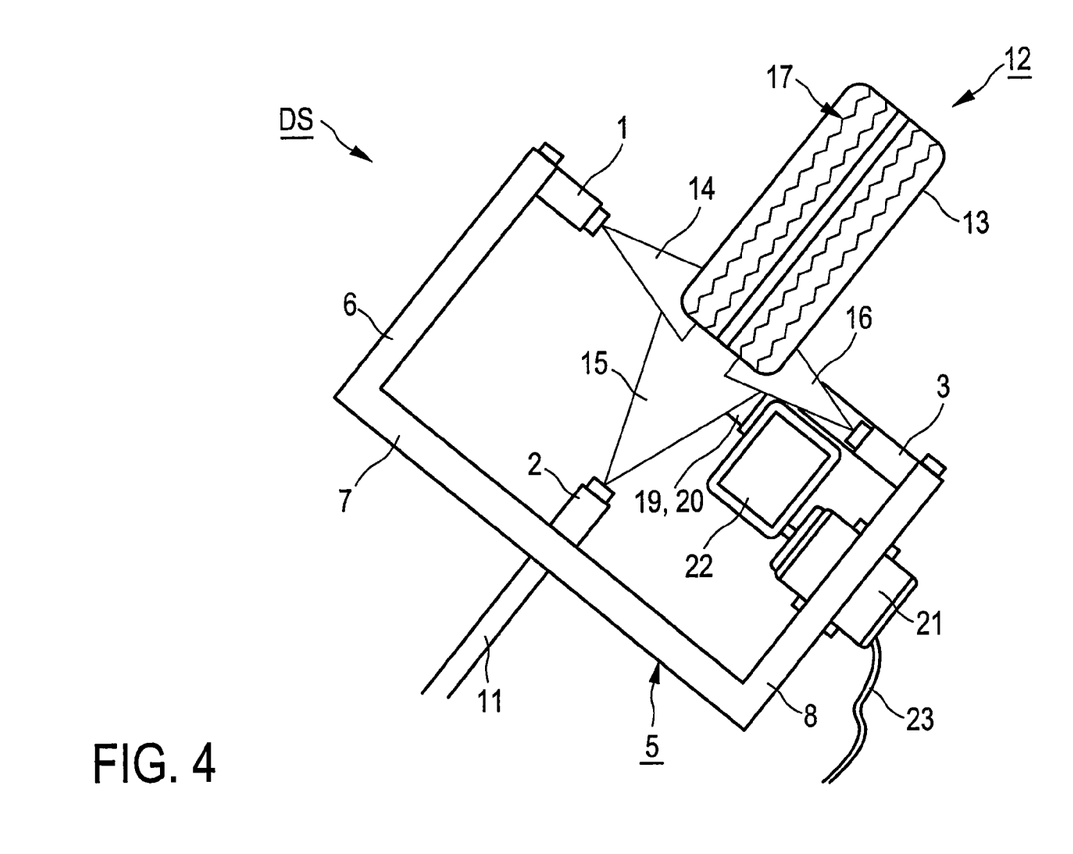
FIG. 4 shows a top view of the wheel diagnosis system shown in FIG. 3.

The top view of FIG. 4 shows the arrangement of the plurality of cameras at the different predetermined positions of the supporting unit 5 and also the particular scanning range (first to third scanning ranges 14 to 16) of each of the plural cameras 1 to 3. Power supply to the drive unit 21 is performed by a corresponding cable 23.

Hence, the arrangement according to the third embodiment of the present invention provides the motorized setup, which can be a direct-drive system similar to existing on-board balancer (finish balancer) without a gearbox, or with the gearbox 22 for providing different rotational speeds and an optimized speed adaptation. The system may include the incremental encoder 19 or not. In case there is no incremental encoder provided, as a further option, a single sticker or a check mark can be provided to one of the sidewalls of the tire to be used as an angular reference as it is described in conjunction with the first embodiment.

The single sticker or check mark SM which is preferably but not necessarily provided on one of the tire sidewalls is picked-up by the respective one of the plurality of cameras 1 to 3, and this supports the determination that at least one complete rotation of the vehicle wheel 12 to be tested has been reached.

The wheel diagnosis system DS according to the third embodiment of the present invention basically provides the same advantages as that of the first and second embodiments due to the freely and easily movable supporting unit 5 which can be moved to the optimized scanning position close to the vehicle wheel 12 by the operator or user by using the handle bar 11. In addition, the motorized arrangement according to the third embodiment provides the further advantages that the measurement operation can be performed without any manual rotation of the wheel 12 under test. That is, the user or operator does not need to manually touch the vehicle wheel 12 to be tested to provide the rotation thereof. Furthermore, since the rotation of the vehicle wheel 12 under test is performed in a motorized manner, a completely automatic operation of the wheel diagnosis system according to the third embodiment can be obtained.

In this case, a central controller, such as a personal computer or any hardware board may perform control of the drive unit 21, the gearbox 22, if provided, of the plurality of cameras, and of the incremental encoder (rotary encoder) 19, preferably with feedback control. Data can be collected automatically for at least one rotation of the vehicle wheel 12 under test, and a subsequent data evaluation can also be provided leading to the display of the detection result which is easily readable and recognizable for the operator. Also the gearbox 22 can be controlled (for example for adaptation of rotational speed) if the gearbox 22 is provided.

The drive unit 21, the gearbox (if provided) and the contact roller 20 in conjunction with the incremental encoder 19 are fixed to the supporting unit 5 so that the complete arrangement of the wheel diagnosis system DS according to the third embodiment can be freely moved when moving the supporting unit 5 by means of the handle bar 11. It is necessary to locate the supporting unit 5 close to the vehicle wheel 12 so that upon driving the contact roller 20 the treaded surface of the tire 13 is reliably touched and the vehicle wheel 12 under test can be rotated without any slip.

Figure 3:
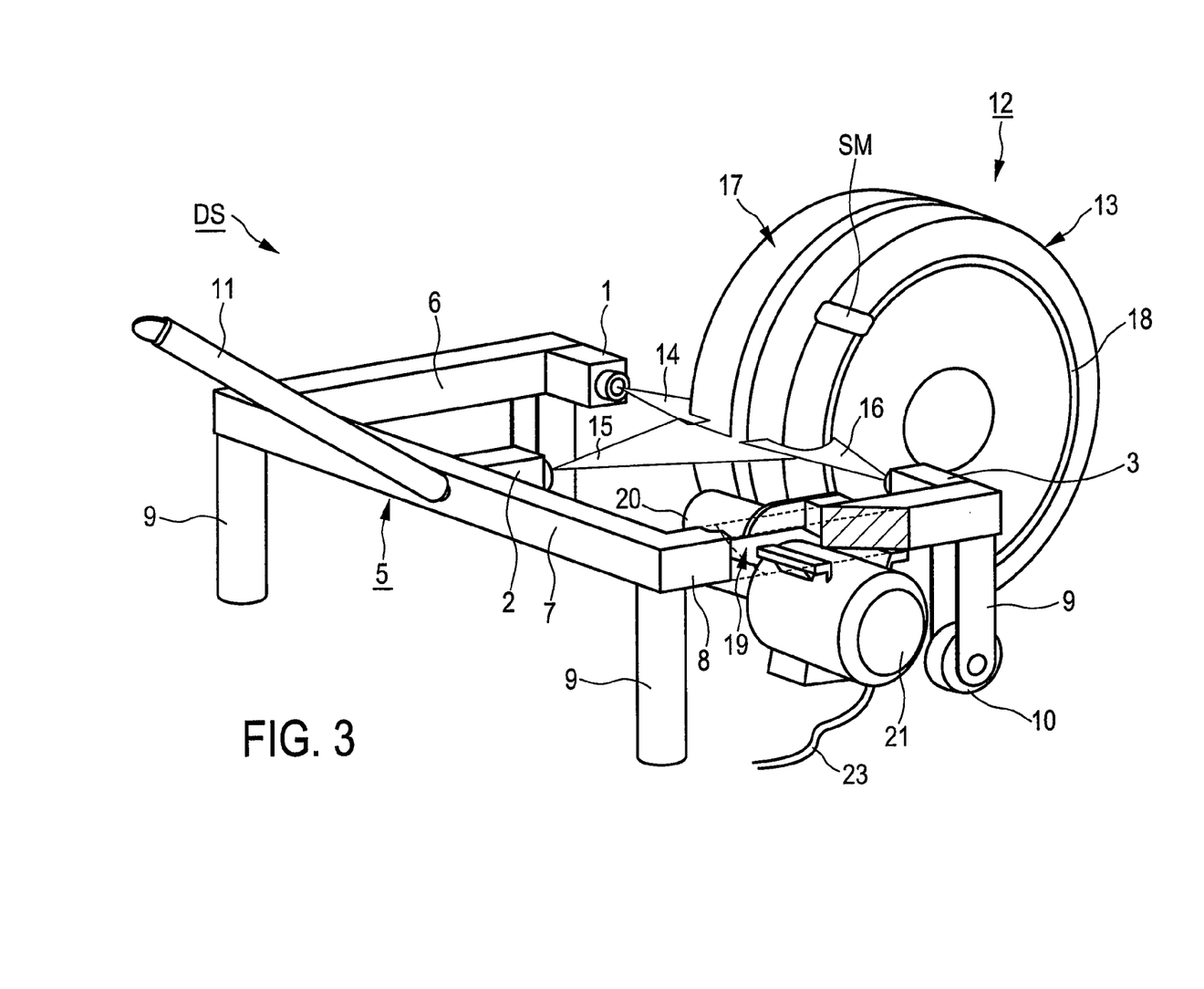
FIG. 3 shows an arrangement of the wheel diagnosis system according to a third embodiment of the present invention.
Figure 5:
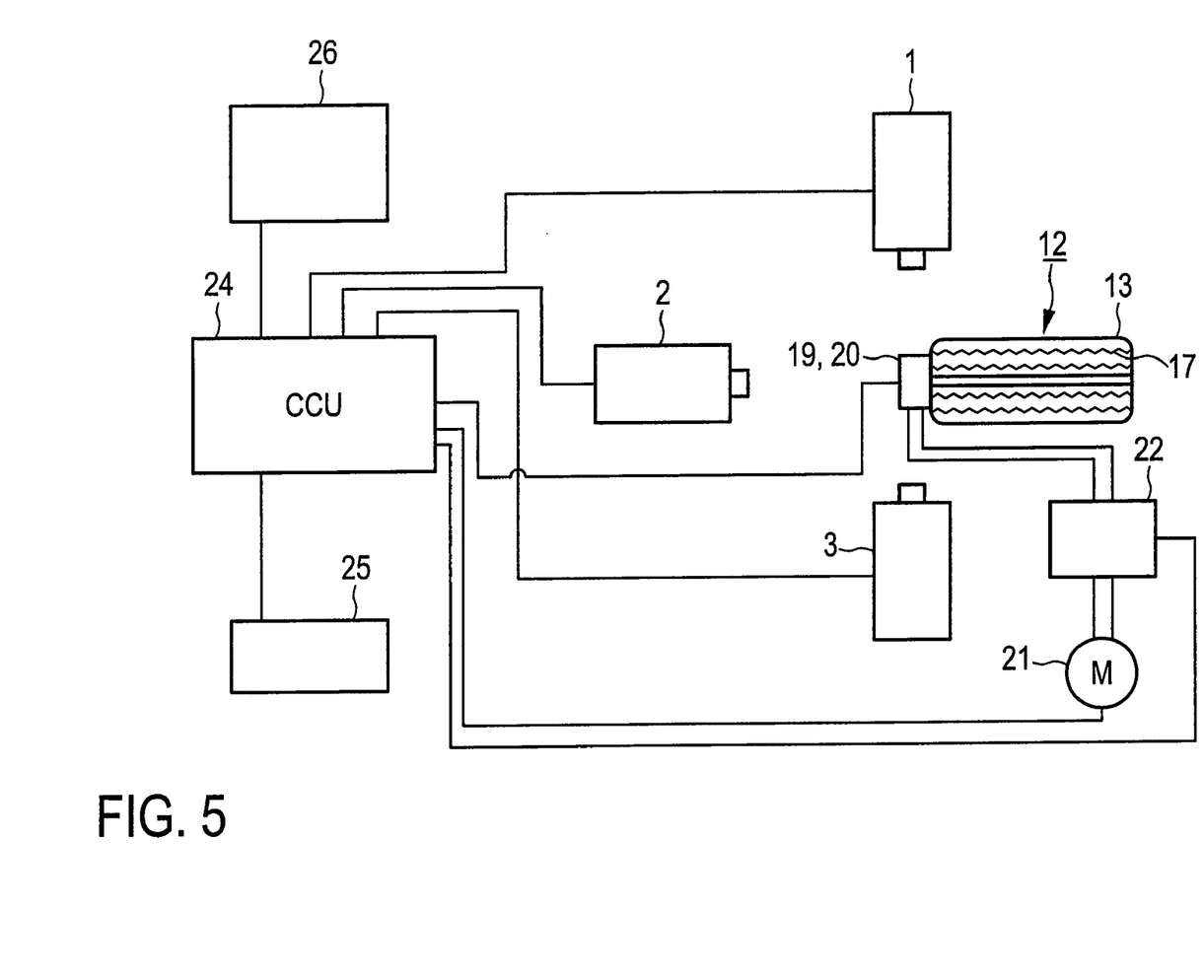
FIG. 5 shows a block circuit arrangement of the functional components of the wheel diagnosis system according to FIG. 3.

FIG. 5 shows an electrical block circuit (the functional components) of the devices and units of the wheel diagnosis system DS of the first to third embodiments, and specifically, for example, the embodiment as shown in FIGS. 3 and 4.

The block circuit includes a central control unit (CCU) 24 which is connected to each of plurality of cameras 1 to 3 (sensing units). The detection result, that is, the scanned or picked-up images of the respective predetermined portion the wheel 12 or of the tire 13 is transmitted as an electrical signal (data signal) to the central control unit 24 for further data evaluation. The central control unit 24 may be based on a microprocessor and may include the necessary hardware and also the software for performing the data evaluation and to derive from this basis the desired diagnostic data. The data according to the detection result can also be stored in a corresponding storing means (not shown), and a certain storage area can be provided for storing standard data about properties of different kind of tires and vehicle wheels. The standard data can be implemented beforehand at the time of manufacturing the wheel diagnosis system DS and can be updated if necessary.

The central control unit 24 is also connected to the incremental encoder 19 which is in mechanical contact with the rotatable vehicle wheel 12, and therefore in touch with the tread surface 17 of the tire 13. The encoder information (rotary angle reference data) are transmitted to the central control unit 24.

The central control unit 24 is further connected to the drive unit 21 including, for example a motor, as well as to the gearbox 22, if provided. FIG. 5 indicates a mechanical connection between the drive unit 21 and the wheel 12 via the gearbox 22, if provided. Both the drive unit 21 and the gearbox 22 can be controlled and even monitored by the central control unit 24.

The control unit 24 is further connected to an input device, such as a keyboard for inputting data and commands by the user or operator. The input device 25 may also serve for advising the central control unit 24. Detection results may be processed in a suitable manner by the central control unit 24 and may be displayed as an easily readable image on a display 26 connected to the central control unit 24. On the display 26, a three-dimensional image or any other images and data can be displayed.

In FIG. 5 the connections between the respective devices and units and the central control unit are depicted as connection cables. Except the power cable for supplying power to the drive unit 21, the further control instructions and data transfer may also be performed in a wireless manner. Cables are appropriate in case the central control unit 24 and the further input device 25 and display 26 are arranged on the supporting unit 5. Specific cables would be necessary if the central control unit 24 (and the further means 25 and 26) are provided stationary and separately from the freely movable supporting unit 5. In this case, also a wireless communication could improve the movability of the supporting unit 5.

It is also possible to provide the user or operator with a remote control for remotely inputting data or operation instructions when the central control unit 24 and its peripheral devices 25 and 26 are separated from the supporting unit 5. The use of a remote control further improves the free movability of the supporting unit 5 to and from the vehicle wheel 12 under test.

The software used in the central control unit 24 after scanning and corresponding data evaluation may define a deviation between stored standard or reference data (with tolerances considered) and actually scanned data reflecting the condition of the tire 13 of the wheel 12 under test. If a deviation is greater than a predetermined suitable threshold value, a corresponding indication (alarming condition) may be given to the operator.

Fourth Embodiment

A fourth embodiment of the wheel diagnosis system DS according to the present invention will be described hereinafter in conjunction with FIGS. 6 and 7.

Figure 6:
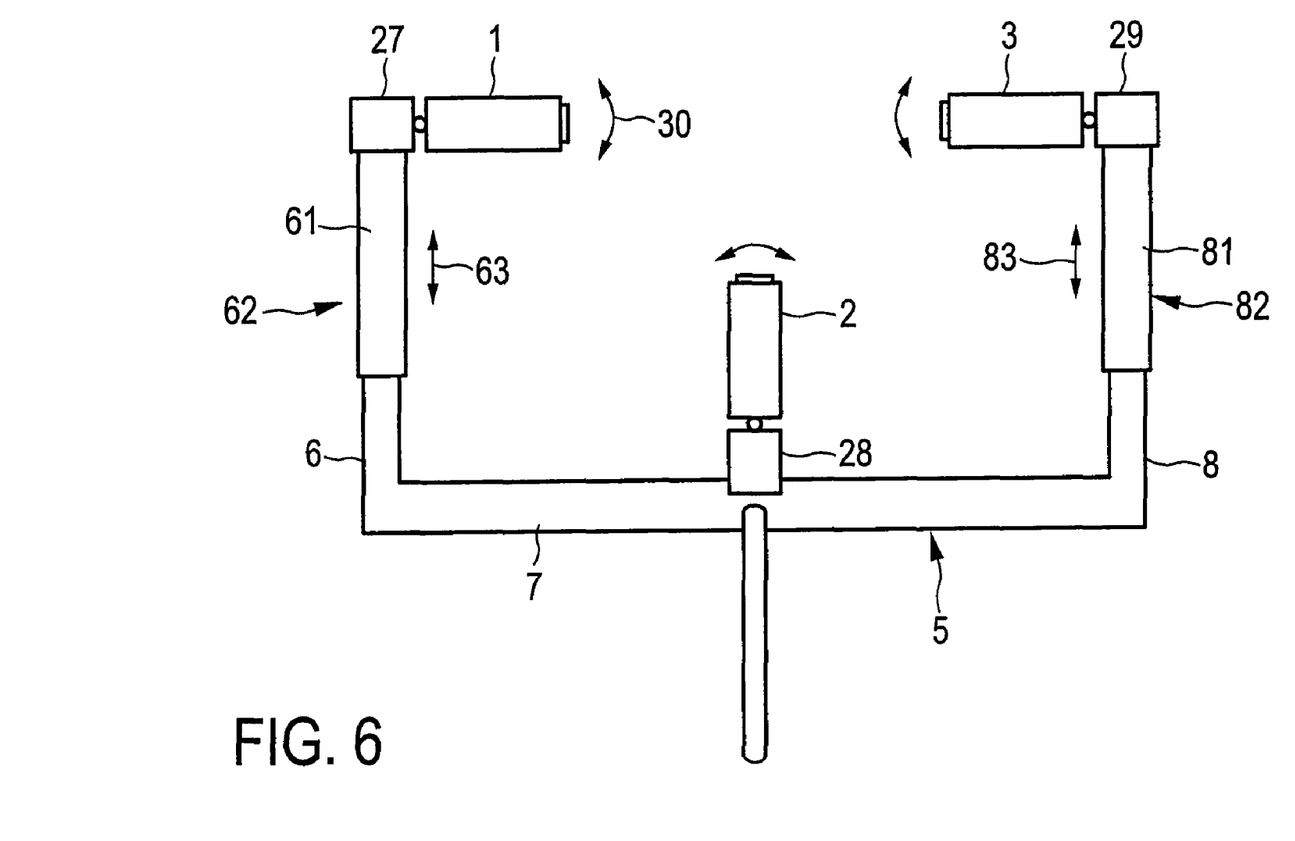
FIG. 6 shows a top view of the wheel diagnosis system DS according to a fourth embodiment of the present invention.

FIG. 6 shows a top view of the wheel diagnosis system DS according to a fourth embodiment of the present invention.

As can be seen from the context of FIG. 6 the wheel diagnosis system DS includes a supporting unit 5 which is basically arranged in the same manner as the supporting unit (frame) of the first to third embodiments. Therefore, the wheel diagnosis system DS further includes first to third sensing units preferably provided in the form of a plurality of cameras 1 to 3. The arrangement and scanning direction or image pick-up direction substantially corresponds to the structure and operating conditions of the plurality of cameras 1 to 3 of the other embodiments. More specifically, the scanning direction or image pick-up direction is as depicted in FIGS. 1 to 4 and mentioned a first to third scanning ranges 14 to 16.

The supporting unit 5 as shown in FIG. 6 comprises a left frame portion 6, a central frame portion 7 as well as a right frame portion 8. In addition to the arrangement of the supporting unit 5 of the other embodiments, according to the fourth embodiment the left frame portion 6 further carries a left (first) movable arm 61 which can be slidingly moved on the left frame portion 6 so that the length of the entire left frame portion 6 (elements 6 and 61) can be adjusted.

In a similar manner the right frame portion 8 carries a right (second) movable arm 81 so that the total length of the two elements 8 and 81 can be adjusted. Both movable arms 61 and 81 can slide on the respective frame portions 6 and 8 according to a certain moving range for adjusting the total length thereof, and in a preferred development the respective arms 61 and 81 may be arranged in a telescopic manner. The first and second movable arms 61 and 81 are respectively assigned to the first and third cameras 1 and 3.

The provision of the movable arms 61 and 81 respectively slidingly mounted to the left and right frame portions 6 and 8 allows a movement or variation of the actual position of the first and third cameras 1 and 3, thereby varying the position of the first and third cameras 1 and 3 on the supporting unit 5 and extending the operation range and varying the scanning range (image pick-up range) of each of the first and third cameras 1 and 3. That is, when the two movable arms 61 and 81 are moved for adjusting the image pick-up position or scanning position of each of the cameras 1 and 3, a movement is performed according to respective arrows 63 and 83 shown in FIG. 6.

The supporting unit 5 may further include sensing unit servo devices for individually positioning each of the cameras 1 to 3. The sensor unit servo devices are provided in the form of a first, a second and a third servo device 27 to 29 as shown in FIGS. 6 and 7. That is, the first servo device 27 carries the first camera 1 and is adapted for individually varying the scanning or image pickup direction of the first camera 1, specifically by panning or tilting the first camera 1. Moreover, the second servo device 28 carries the second camera 2 and is also adapted for panning or tilting the scanning or image pickup direction of the second camera 2. Similarly, the third servo device 29 carries the third camera 3 for performing panning and tilting of the scanning or image pickup direction thereof. The possible panning and tilting of each individual camera 1 to 3 is depicted in FIG. 6 by means of arrows 30.

Figure 7:
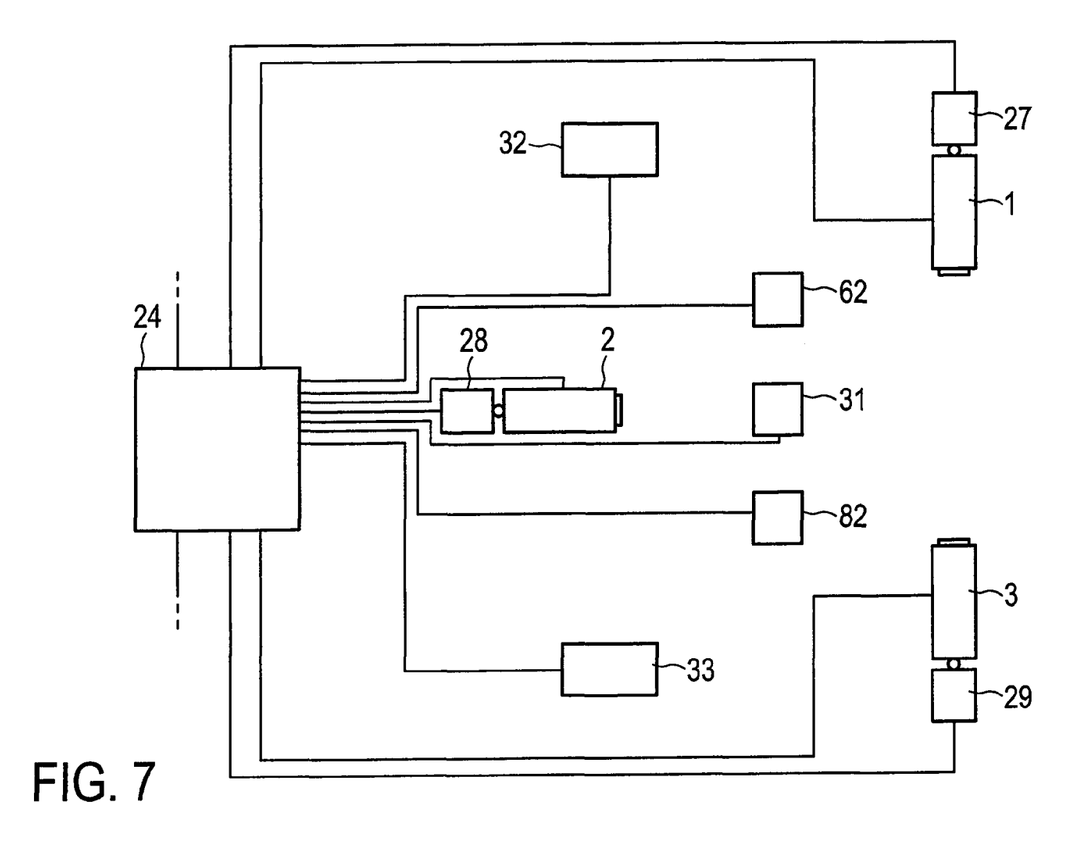
FIG. 7 shows a block circuit arrangement of the functional components of the wheel diagnosis system according to the fourth embodiment.

FIG. 7 shows a block circuit arrangement of the functional components of the wheel diagnosis system according to the fourth embodiment.

FIG. 7 shows a central control unit 24 (CCU) which corresponds to the central control unit 24 as shown in FIG. 5. The central control unit 24 may be based on microprocessor technology and may include hardware and software for performing control of the devices connected thereto, as well as for performing a corresponding data evaluation.

Specifically, and as already shown in FIG. 5, each of the plurality of sensing units or cameras 1 to 3 is connected to the central control unit 24. Furthermore, the first to third servo devices 27 to 29 which respectively carry the plural cameras 1 to 3 are also connected to the central control unit 24. Based on such a connection which may be wired or wireless the operation of the respective servo devices 27 to 29 can be controlled, and it is also possible to derived from encoding means arranged in the servo devices 27 to 29 the actual position and operation conditions thereof.

The central control unit 24 therefore is adapted for controlling the operation of each of the cameras 1 to 3 and each of the servo devices 27 to 29.

The central control unit 24 is further connected to a first and a second frame actuator 62 and 82 which are respectively arranged in or at the movable arms 61 and 81, respectively, for providing the (preferably sliding) movement of the respective movable arms 61 and 81. By means of the central control unit 24, adaptation of the length of the entire left or right frame portions 6 and 8 can be performed in a manual or automatic manner according to the predetermined control concept stored in the central control unit 24 or in an external host computer connected thereto.

In a similar manner as is shown in FIG. 4, the vehicle diagnosis system DS may also include the contact roller 20 in conjunction with an incremental encoder 19 and may be driven by the drive unit 21 for rotating the wheel 12 under test. In addition to this arrangement, the contact roller 20 may include a pressure sensor 31 (FIG. 7) for detecting the pressure or force by which the contact roller 20 is urged to the running surface (tread surface) of the tire 13 of the wheel 12 under test. The detected contact pressure or force is input to the central control unit 24 connected to the pressure sensor 31, and data evaluation can be performed to define whether the pressure is high enough to ensure a correct and interrupt-free driving of the wheel 12.

The central control unit 24 is further connected to a first and a second stand actuator 32 and 33 (FIG. 7) for adapting, on the one hand, the heights of the stands 9 of the supporting unit 5 (see FIGS. 1 to 3), and on the other hand, moving the rollers 10 to adapt the position of the supporting unit 5 relative to the vehicle wheel. The connection of the stand actuators 32 and 33 to central control unit 23 enables a proper control of the operation of the stand actuators 32 and 33 for adapting the complete position of the supporting unit 5. The stand actuator may include electrical motors or any other suitable electro-mechanical devices.

The arrangement shown in FIG. 6 as well as the block circuit shown in FIG. 7 allow a precise positioning and adaptation of the wheel diagnosis system DS relative to the vehicle wheel 12 under test.

The additional means and devices provided to the supporting unit 5 according to FIG. 6 can also be provided to the supporting unit 5 of the previous embodiments 1 to 3. Moreover, the supporting unit 5 of the wheel diagnosis system DS may only include the contact roller 20 with pressure sensor and encoder 19, or may include the drive unit 21 for driving (rotating) in a motorized manner the vehicle wheel 12.

In case the wheel diagnosis system DS according to the first embodiment of the present invention includes the additional means and devices shown in FIG. 6, but the contact roller 20 and the incremental encoder 19 are omitted, then the operator in a factory or garage can move supporting unit 5 towards the vehicle wheel (when the vehicle is lifted so that the wheel can be rotated), and the operator will perform a rough positioning of the supporting unit 5 relative to the wheel 12. In this situation, the supporting unit 5 may be inclined relative to the vehicle wheel 12 and not in the correct scanning or image pick-up position. In this case, the user may activate a preliminary scanning for calibration purposes. The plurality of sensing units or cameras 1 to 3 are activated for picking-up corresponding images in a preliminary process (calibration process), and according to a predetermined algorithm, the images may be analyzed and compared to each other, so that based on image matching or mismatching the misalignment of the supporting unit 5 relative to the wheel 12 can be detected. In this connection, each of the cameras 1 to 3 may detect the distance to the vehicle wheel (tire surface or rim), and upon data evaluation, the misalignment can be detected and a correct positioning of the supporting unit 5 to obtain the optimized scanning or image pick-up position can be performed.

The central control unit 24 may activate the different actuators, such as the servo devices 27 to 29 for panning or tilting the cameras 1 to 3, or the frame activators 62 and 82 for adjusting the length of the left and right frame portions 6 and 8, respectively. For calibration of the system the control of the activators 27 to 29 and 62 and 82 can be performed automatically by the central control unit 24 upon corresponding data evaluation, that is, the processing of the measured distances between each of the sensing units or cameras 1 to 3 and the wheel 12 or upon evaluation of the picked-up images in conjunction with image matching.

When the wheel diagnosis system DS is equipped with the contact roller 20 further including the incremental encoder 19 as well as the pressure sensor 31, the user will place the supporting unit 5 close to the vehicle wheel so that the contact roller 20 is in close contact to the surface of the tire 13. In this case, a rough positioning of the supporting unit 5 close to the vehicle wheel 12 is achieved. The user can activate the central control unit 24 by means of the input device 25 (FIG. 5) to perform a calibration process according to a predetermined sequence. In this connection, the central control unit 24 may control the cameras 1 to 3 for picking-up corresponding images of the vehicle wheel 12 or parts thereof to perform image matching and image correlation of the images of the respective cameras 1 to 3. That is, for example, corresponding scanning results of the first and third cameras 1 and 3 may basically be confined to the tire 13, and the resulting images can be correlated since in general both sidewalls of the tire 13 (the inner sidewall and the outer sidewall thereof) have substantially the same shape.

Furthermore, a distance measurement in addition to the correlation process or as the only measurement can be performed, thereby measuring the distance between the cameras 1 to 3 and the main structural features of the tire 13 or the vehicle wheel 12. Correlation results can also be obtained when detection results are compared and correlated with stored basic information about the vehicle wheel 12 and/or the tire 13. In case a misalignment is detected, fine-tuning of the correct position can be performed by the central control unit 24, by activating at least one of the servo devices 27 to 29 respectively carrying the cameras 1 to 3, or the frame actuators 62 and 82 for adjusting the length of the left and right frame portions 6 and 8.

Moreover, the central control unit 24, upon request by the user, can activate the stand actuators 32 and 33 for adjusting the heights of the stands 9 which correspond to the height of the position of the cameras 1 to 3 relative to a ground surface, as well as adjusting the position of the supporting unit 5 relative to the vehicle wheel 12 in view of any angular difference or variance, when the supporting unit 5 is positioned slightly inclined to the vehicle wheel 12.

The data evaluation of the output signals of the pressure sensor 31 is indicative of a correct position to the vehicle wheel 12.

Hence, the data evaluation preferably performed in the central control unit 24 or in a host computer connected thereto provides an information about alignment or misalignment of the supporting unit 5 relative to the vehicle wheel 12, and in case of misalignment the wheel diagnosis system DS can automatically performed adjustment (calibration) by means of the various actuators described, for example, in conjunction with the fourth embodiment of the present invention. In general, the actuators have encoders for providing the central control unit 24 with information about the actual operating conditions or positions of the respective actuators, and in general it is necessary to make the output signals of all the sensing units, such as the cameras 1 to 3 subject to a predetermined data evaluation.

The calibration or setting process can be carried out before a scanning for picking-up useful data about the vehicle wheel 12 under test is performed, thereby ensuring reliable about the vehicle wheels.

It is further to be noted, as already mentioned above, that the various actuators depicted in FIGS. 6 and 7 can be applied all or in part to the arrangement of the supporting unit 5 of the vehicle diagnosis system DS without problems. That is, the arrangement shown in FIGS. 6 and 7 can easily be applied to the supporting unit 5 of each of the first to third embodiments of the present invention. In case any of the servo devices 27 to 29, pressure sensor 31, the frame actuators 62 and 82 and the stand actuators 32 and 33 are omitted, the respective detection signals are not included in the control concept, and the central control unit 24 will perform the control concept and calibration concept based on the available sensor signals and actuators which can be driven for obtaining the optimized scanning or image pick-up position. This calibration concept can be combined with the control of the operation of the drive unit 21 and the gear box 22 when such devices are provided (third embodiment, FIGS. 3 and 4).

In case the wheel diagnosis system DS according to the present invention includes the drive unit 20 and the gear box 22 (FIGS. 3 and 4) for automatically rotating the vehicle wheel 12 under test, the calibration concept (setting procedure) may include a rotation of the vehicle wheel 12 under test with a predetermined higher or lower speed to perform a preliminary scanning or image pick-up process as a basis for the provision of data according to which the calibration of the position of the supporting unit 5 relative to the vehicle wheel 12 under test can be performed.

The central control unit 24 or a computer system (such as an external host computer) connected thereto includes a corresponding software for providing a correlation of images or the scanned data and for obtaining data evaluation on the basis of the pick-up images from the plurality of cameras 1 to 3. When the supporting unit 5 is positioned close to the vehicle wheel 12 to be examined, specifically both the first and the third cameras 1 and 3 are activated for performing distance measurements (scanning operation), and the detection results (picked-up images, scanned data) of the first and third cameras 1 and 3 may basically be confined to the tire 13 as the object of interest, and, for example, the corresponding images or scanned data of both sidewalls of the tire 13 (the inner sidewall and the outer sidewall thereof) can be correlated and data matching can be performed.

The display 26 as shown in FIG. 5 may be used to indicate to the user or operator the results of the calibration process, such as a detected misalignment, the automatic operation of the wheel diagnosis system DS such as the activation of particular actuators for performing the calibration (setting) and the achievement of the final (optimized) position of the wheel diagnosis system DS when the wheel diagnosis system DS is ready for normal scanning (collection of diagnostic data).

The arrangement of the plurality of cameras 1 to 3 as for example shown in the top view of FIG. 4 indicating the basic structure common to all embodiments 1 to 4 shows that the plural cameras are arranged preferably symmetric with respect to the vehicle wheel 12 under test. According to the fourth embodiment of the present invention an arrangement other than the symmetric arrangement can be obtained with the length of the left and right frame portion being adjustable (FIG. 6). The corresponding data evaluation concept takes account of the varying scanning positions.

The central control unit 24 can perform a control such that each of the plurality of cameras 1 to 3 is synchronized to the respective other cameras to provide a scanning result in correspondence with a predetermined rotary angle, and to avoid any condition wherein one camera disturbs the scanning result of the other camera. The present invention is also not confined to the number of cameras as depicted in the figures and mentioned in the present description. Any suitable number of cameras can be used when it is ensured that all interesting portions of the wheel 12 under test can be scanned.

The possibility of automatically performing the scanning process according to the third embodiment (FIGS. 3 to 5) allows a confirmation of the achievement of reasonable detection results. In this connection, a plausibility check or a verification can be performed and a corresponding confirmation on a display can be provided if the detection result was out of a reasonable range.

The wheel diagnosis system DS according to the present invention therefore requires reduces effort and work since the vehicle wheel 12 to be examined need not to be detached from the vehicle. Only a slight lifting of the vehicle is necessary so that the wheel 12 under test can easily be rotated. According to a third embodiment the advantages can be obtained without any manual operation by the user or operator. Specifically, the vehicle wheel 12 to be examined is in a motorized manner rotated by the drive unit 21. The vehicle diagnosis system DS according to the fourth embodiment of the present invention is further adapted to provide calibration (correct setting) of the wheel diagnosis system DS before the intended main measurement is made and data are collected to obtain reliable and significant data (detection or scanning results) about the wheel 12 under test.

The wheel diagnosis system DS according to the present invention therefore represents a stand-alone device freely movable to and from the vehicle wheel 12 under test and preferably involving SOL (stripe-of-light) cameras. The necessary means and devices are arranged on one rigid frame such as the supporting unit 5, and handling of this supporting unit 5 is facilitated, specifically in conjunction with the adjustable left and right frame portions 6 and 8 (FIG. 6). Moreover, the supporting unit 5 may be provided with smaller preferably electric motors (driving device) at its stands 9 so that the movement of the supporting unit 5 to and from the vehicle wheel 12 under test is still more improved. The control of such a motorized movement of the supporting unit 5 may be controlled by the central control unit 24 and preferably via a remote control operated by the user.

Furthermore, the wheel diagnosis system DS of the present invention can as an additional option include an imbalance measurement capability, so that any information about the tread 17 and sidewalls of the tire 13 (geometric data) can be picked-up, and this process can be integrated and combined with the provision of imbalance data, so that a complete and comprehensive wheel diagnosis (tire condition, rim condition and imbalance condition) can be performed. This will further reduce work, effort and time to obtain full analysis of the vehicle wheel 12 under test.

The measurement capabilities of the wheel diagnosis system according to the present invention and as described above in conjunction with the first, second and a third embodiments, may include the measurement of dimensions of the wheel 12 and the rim 18 (vehicle wheel assembly). Regarding a radial and lateral run-out of the tire 13 and the rim 18, measurement is in general not possible, since when the car is lifted the distance between the wheel axis and the measurement head is not kept constant during wheel rotation due to the suspension system of the vehicle. In order to perform run-out measurement there is needed a probe constantly measuring the relative distance between the measuring system and the wheel axis.

The measurement capabilities may further include the measurement of number and location of spokes, including unevenly distributed spokes, as well as tire sidewall conditions, such as bulges and depressions. The type of the rim can also be determined, such as the best wheel weight placement method (balancing), the type of wheel weight to be used and so on. It can also be detected the presence of wheel weights attached to the rim.

Furthermore, measurement or detection can be made regarding an improper bead seating, the valve position, the tire tread depth, the tire geometrical conicity, tire tread flat spots and irregular tire tread wear.

While the present invention has been illustrated and described in detail in the drawings and the foregoing description, such illustrations and descriptions are to be considered illustrative or exemplary and not restrictive, and the present invention is not limited to the disclosed embodiments.

Other variations to the disclosed embodiments can be understood and effected by those skilled in the art in practising the claimed invention, from a study of the drawings, the disclosure, and the appended claims.

The invention claimed is:

1. Wheel diagnosis system (DS) for diagnosing a wheel (12) under test mounted to a vehicle, comprising:

a plurality of sensing units (1, 2, 3) being adapted for scanning predetermined surfaces of set wheel under test when the wheel under test is rotated, a supporting unit (5) to which said plurality of sensing units is mounted, wherein said supporting unit being freely movable relative to said wheel under test on said vehicle, and said sensing units being located at different positions on said supporting unit for scanning different portions of said predetermined surfaces of said wheel under test and collecting data of said operation result when said supporting unit is placed at the wheel under test at a predetermined scanning position.

2. System according to claim 1, wherein said wheel (12) under test includes at least a rim (18) and a tire (13), and wherein each of said sensing units (1, 2, 3) has a predefined scanning range (14, 15, 16), each of the scanning ranges being directed to one of the tread surface (17) and a first and a second sidewall of said tire (13).

3. System according to claim 1, further including a rotary encoder (19) which is mechanically coupled to said wheel (12) under test by a contact roller (20) and which is adapted for detecting a rotational movement of said wheel.

4. System according to claim 1, further comprising a drive unit (21) operatively connected to said wheel (12) under test by a contact roller (20) and being adapted for rotating said wheel in a predetermined manner when said supporting unit (5) is in the predetermined operation position, the operation of said drive unit (21) being controlled by a control unit (24) to thereby control the rotation of said wheel (12) under test.

5. System according to claim 1, wherein said supporting unit (5) further comprises a first movable arm (61) and a second movable arm (81) on which a first and a third sensing unit (1, 3) of the plurality of sensing units (1 to 3) are respectively mounted, for varying the position of said first and third sensing units on the supporting unit.

6. System according to claim 1, wherein said supporting unit further includes first, second and third servo devices (27 to 29) respectively carrying said plurality of sensing units (1 to 3), for varying a scanning direction respectively assigned to each of the plurality of said sensing units.

7. System according to claim 3, wherein said contact roller (20) is associated with a pressure sensor (31) for detecting the pressure between said contact roller and said wheel (12) under test.

8. System according to claim 1, wherein said supporting unit (5) is movable in a manual manner or in a motorized manner by a driving device for moving said supporting unit relative to said wheel (12) under test.

9. Method of diagnosing the condition of the wheel (12) under test mounted to a vehicle, the method comprising the steps of:

freely moving a supporting unit (5) having a plurality of sensing units (1, 2, 3) located thereon at different positions thereof, to a predetermined location relative to said wheel under test, controlling said plurality of sensing units for performing a scanning operation of different surfaces of said wheel under test and outputting a scanning result when said wheel under test is rotated, thereby collecting data of said scanning result, and evaluating said collected data to define the condition of said wheel under test.

10. Method according to claim 9, wherein said wheel (12) under test includes at least a rim (18) and a tire (13), and wherein each of said sensing units (1, 2, 3) has a predetermined scanning range (14, 15, 16), and said controlling step including a step of controlling said plurality of sensing units for picking up images of at least a tread surface (17) and a first and a second sidewall of said tire (13).

11. Method according to claim 9, wherein said controlling step includes a step of inputting an angular reference information obtained by a rotary encoder (19) from said wheel (12) under test when rotated during said scanning operation, and assigning said angular reference information to the collected data of said scanning result of said wheel under test when rotated, as well as inputting a pressure information obtained by a pressure sensor (31) indicative of the pressure between said contact roller and said wheel under test.

12. Method according to claim 9, wherein said controlling step includes the step of picking up an image of a check mark (SM) provided to a predetermined position on said wheel (12) under test as an angular reference information during said scanning operation when said wheel is rotated, and assigning said angular reference information to the collected data of said scanning result of said wheel under test when rotated.

13. Method according to claim 11 or 12, further comprising a step of controlling a drive unit (21) operatively connected to said wheel (12) under test by a contact roller (20) for causing said drive unit to rotate said wheel under test in a predetermined manner.

14. Method according to claim 12, wherein said step of controlling said drive unit (21) includes a step of performing a control of said drive unit depending upon the detection of said check mark (SM) as an angular reference information, during said scanning operation when said wheel (12) under test is rotated by said drive unit.

15. Method according to claim 13, wherein said step of controlling said drive unit (21) includes the step of performing a control of said drive unit depending upon said angular reference information provided by said rotary encoder (21) during said scanning operation when said wheel (12) under test is rotated by said drive unit.

* * * * *